June 28, 1938.   A. A. REID   2,122,214
AIRCRAFT
Filed April 23, 1937   3 Sheets-Sheet 1

Inventor
Arthur A. Reid.
By Raymond Jones.
Attorney

Inventor
Arthur A. Reid.
By Raymond Jones
Attorney

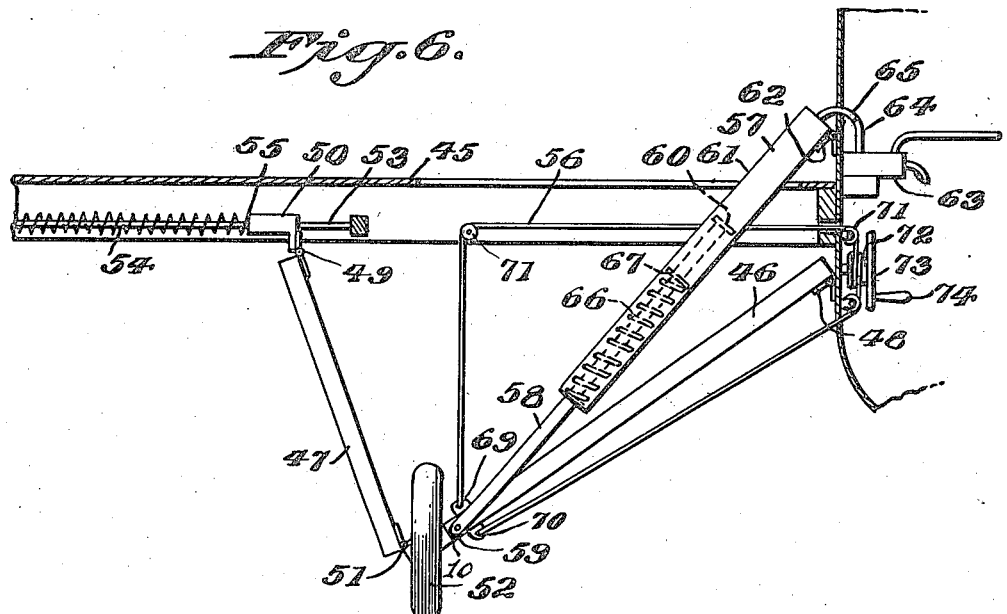

Patented June 28, 1938

2,122,214

UNITED STATES PATENT OFFICE 2,122,214

AIRCRAFT

Arthur Abner Reid, Dickson City, Pa.

Application April 23, 1937, Serial No. 138,636

14 Claims. (Cl. 244—43)

This invention relates to aircraft and, more particularly, to an auxiliary plane adapted to be displaced to form a dihedral in combination with a landing gear associated therewith.

The main object of the invention is to provide an auxiliary plane which, in normal flight, assumes a folded position closely adjacent to and below a main plane of the aircraft but which may be displaced to form a dihedral plane below the main plane preferably prior to landing or take-off of the aircraft in a manner to permit a landing or take-off at a relatively low speed.

Another object is to provide a retractable landing gear wherein the landing wheel or float is associated with an extensible dihedral plane whereby, when the dihedral plane is moved to its operative position, the landing wheel or float assumes its operative landing position.

Other objects will appear in the specification which follows and accompanying drawings, wherein—

Fig. 6 shows a modified form of dihedral plane and landing gear and control thereof;

Fig. 7 shows a modification wherein a single auxiliary plane section is used;

Fig. 8 shows one form of control for a single auxiliary plane section; and

Fig. 9 shows a modified form of plane control.

Figure 1:
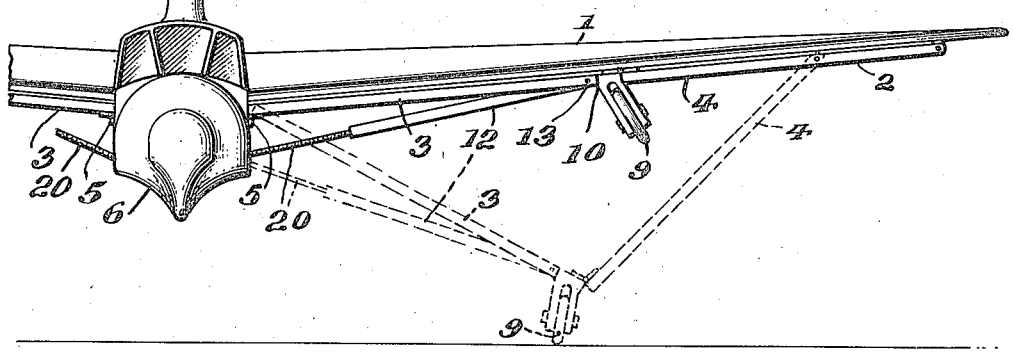
Fig. 1 shows the invention as applied to a monoplane.

Referring to the drawings in detail, Fig. 1 shows a monoplane wherein a main plane 1 is shown as provided with an auxiliary plane 2 which, in normal flight, is positioned below and in contact with this main plane. The auxiliary plane comprises two sections 3 and 4 which are hinged together at about the mid-point of the main plane. The section 3 is hinged at 5 close to the fuselage 6 while the outer tip or free end of section 4 is supported to slide in any desired manner along the under side of plane 1. As shown, sleeves 7 are hinged to the outer tip and are adapted to slide along rod members 8 secured to plane 1. A landing float member 9 is secured by a flexible joint 10 in a semi-rigid manner to the outer end of section 3. The outer section 4 in turn is hingedly connected at 11 to the float member.

A preferred form of operating means for the auxiliary plane sections comprises a tube 12 hinged at 13 adjacent the float 9. The inner end of this tube is threaded at 14 to receive a threaded rod 20 which is connected by a universal joint 16 to a shaft 17. A pair of bevel gears 18 is arranged to drive a pair of shafts 17 in opposite directions to rotate a control rod 20 on each side of the fuselage. The rods 20 are oppositely threaded and, upon rotation, cause translation of an associated tube 12. A bevel gear 21 meshes with gears 18 and is driven through a clutch 22 from a motor 23 or from the aircraft engine. Alternately, a manually operable gear 24 may be clutched in to drive gears 18 by means of a crank 25.

In order to indicate to the pilot the position of plane 2 and float 9, an indicator 26 is provided on the instrument panel. The indicator pointer 27 is rotated by a shaft 28, preferably flexible, which, in turn, is rotated by a gear 29 in mesh with a gear 30 secured to the shaft 17.

Figure 2:
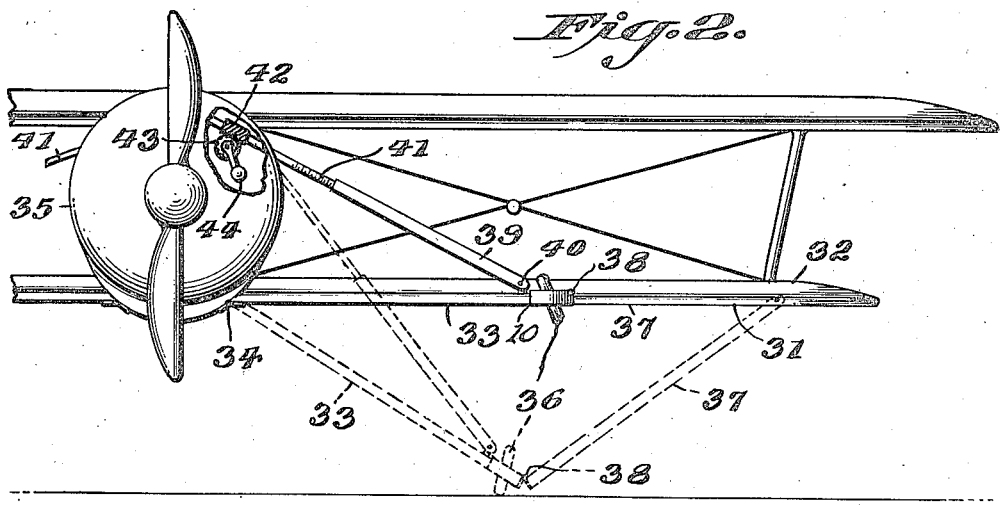
Fig. 2 shows the invention as applied to a bi-plane.
Figure 3:
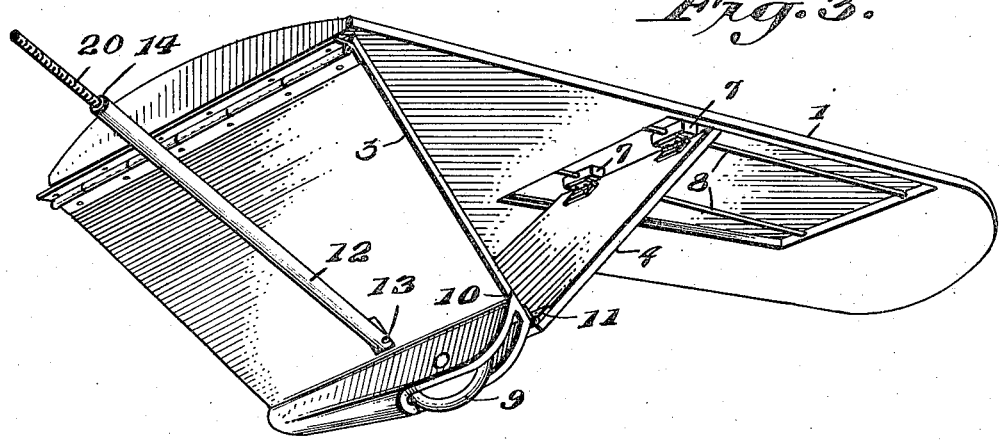
Fig. 3 is a view in perspective showing the dihedral plane in its displaced position.
Figure 4:
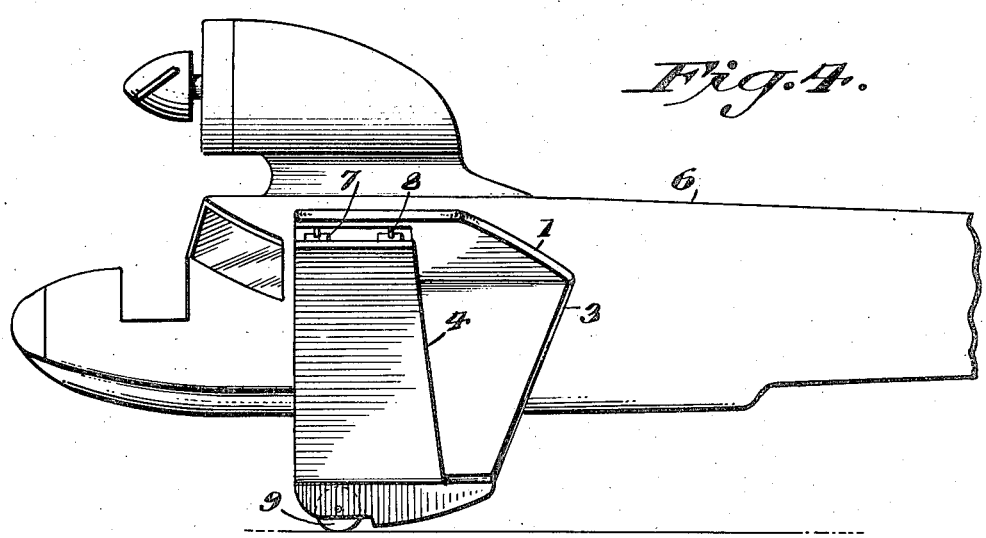
Fig. 4 is a view in side elevation showing the dihedral plane in its displaced position.
Figure 5:
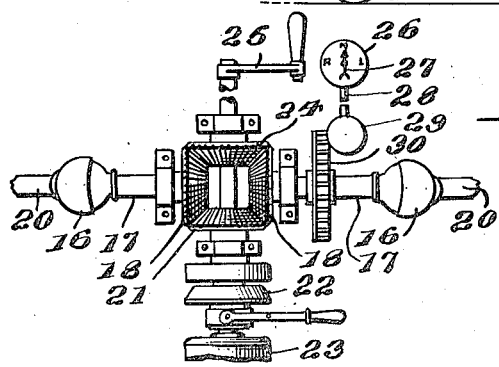
Fig. 5 is a view in detail of operating means for folding the dihedral plane and landing gear.

Fig. 2 is a conventional view of a bi-plane wherein the auxiliary plane 31 is associated with the lower main plane 32. The inner section 33 is hinged at 34 to the fuselage 35 and carries the float 36 at its outer end. The outer section 37 is hinged at 38 to the float and is slidably secured at its outer free end to the plane 32. The control rod 39 is secured pivotally at 40 adjacent the float 36. The screw threaded operating rod 41 is shown as terminating in a worm gear 42 operable by a worm 43 and connected crank 44. Any desired means may be devised to rotate the rod 41 and a conventional form of operating means is shown in Fig. 2.

In Fig. 6 is shown in schematic form, a modification of the auxiliary plane control wherein a main plane 45 is provided with an inner auxiliary plane section 46 and an outer auxiliary plane section 47. The section 46 is hinged at 48 to the fuselage while the section 47 at one end is hinged at 49 to sleeves 50 and at its other end by a hinge 51 is secured to the wheel or float 52. The sleeves 50 are slidable along rods 53. Springs 54 are secured at their outer ends to the plane and at the inner ends at 55 to the sleeves whereby, when the section 46 is extended inwardly and downwardly, the springs are extended. These springs when thus tensioned act to assist in retracting the wheel 52 and plane sections 46, 47. Two separate means are shown for selectively moving the auxiliary plane sections, a cable 56 and a hydraulic operator 57. A rod 58 hinged at 59 adjacent wheel 52 has a piston 60 on its free end slidable in cylinder 61 hinged at 62 to the fuselage. A hand operated oil pump 63 may be used to pump oil from a reservoir via conduits 64 and 65 to cylinder 61. The conduit 65 is preferably a flexible conduit. A spring 66 is positioned between the lower end of cylinder 61 and a plate 67 secured to rod 58. When the piston 60 is moved outwardly with rod 58 to extend the wheel 52 and sections 46, 47, the spring 66 is compressed whereby it will be effective to exert a force tending to retract the wheel 52.

The cable operator 56 is secured at its free ends 69 and 70 adjacent wheel 52 and is fed over a series of pulleys 71 and wound intermediate its ends around a reel 72. The reel is operable by a hand wheel 73 which may be provided with a hand grasp 74.

Fig. 7 shows a modification wherein a single auxiliary plane 75 is hinged at 76 to the fuselage 77. A wheel strut 78 is hinged at 79 to a sleeve 80 which is slidable along a rod 81. The sleeve is moved by a rod 82. The strut 78 is hinged at 83 to the outer end of plane 75. A landing wheel 84 is mounted on the lower end of strut 78. As shown in Fig. 7, the plane 75 and wheel 84 are completely housed in the main plane 85. The strut 78 may be moved by sleeve 80 to a vertical position to permit the wheel to be positioned vertically.

Fig. 8 shows a hydraulic operator for the sleeve 80. Fluid pressure may be admitted to either side of a piston 86 secured to rod 82 by means of conduits 87 and valve 88 to move the rod 82 in either direction. A cable 89 is provided to impart to the wheel 84 its final closing movement which may not be secured by movement of rod 82 and strut 78. The cable 89 need not be directly connected to sleeve 80 but may be connected to a link or lever system device in turn connected to the sleeve in a manner to multiply the motion of the sleeve to more fully raise the wheel 84.

Fig. 9 shows a screw rod operator 90 for the sleeve 80. With the sleeve in its extreme outward position, the strut 78 is positioned vertically as shown in dotted lines.

In the operation of this device, in normal flight the auxiliary planes 3 and 4 will be arranged in their upper position closely adjacent the main plane. When it is desired to land the aircraft, the operator will either rotate the crank 25 or clutch in the motor 23 in a manner to rotate the control rods 20 whereby the tubular members 12 will be drawn axially towards the fuselage. The planes 3 and 4 will thereby be caused to break at hinge 11 and be moved to their lowermost position with the landing wheels or floats 9 below the fuselage.

In this lowered position, the planes 3 and 4 will form a dihedral and function not only to afford an increased stability to the craft but also to provide an increased lift which is additive to the lift of the main planes. As a direct result, the speed of the craft may be reduced materially to permit a safe landing at a much lower speed than has heretofore been possible. Likewise, during the take-off, the increased lift will permit the craft to leave the ground or water at a much lower speed. As a result, a landing or take-off can be made in a much smaller field than has been possible heretofore with known forms of aircraft that include only the tractor propellers.

In the modification shown in Fig. 6, the planes 46 and 47 may be lowered either by the hydraulic means 60, 61 or by the cable control 56. It is to be understood that any one of the several control means shown may be used in connection with any arrangement of auxiliary plane or planes. If desired, the cable operator 56, 72 may be used to move the auxiliary plane in the region close to the main plane in the event that the rod 12 or plunger 58 is not entirely effective to move or retain the planes 3—4 close to the main planes.

While several forms of the invention have been shown on the drawings to indicate that various eqivalents are contemplated, the basic novel idea relates to the provision of an auxiliary plane pivotally connected adjacent the juncture of the main plane and the fuselage and it is to be understood that other modifications are contemplated such as will be embraced within the scope of the appended claims.

What I claim is:

1. In an aircraft, a fuselage, a main plane, an auxiliary lifting plane pivotally secured at one end adjacent the juncture of the main plane and the fuselage and being foldable upwardly closely adjacent the main plane, and means to move said auxiliary plane downwardly to a position below and at an angle to the main plane.

2. In a device as set forth in claim 1 wherein the auxiliary plane when folded upwardly occupies a position within the profile of the main plane.

3. In a device as set forth in claim 1 wherein the means to move the auxiliary plane comprises a control rod pivotally secured at one end to the auxiliary plane at a point remote from the fuselage, and means for moving said rod to raise or lower the auxiliary plane.

4. In a device as set forth in claim 1, a landing device associated with the auxiliary plane and being connected thereto at a point remote from the fuselage.

5. In a device as set forth in claim 1 wherein the auxiliary plane comprises two sections hingedly connected together at a point remote from the fuselage.

6. In a device as set forth in claim 1 wherein the auxiliary plane comprises two sections hingedly connected together, at a point remote from the fuselage to form one section adjacent the fuselage and another section extending towards the outer end of the main plane, the ends of said sections adjacent said point being movable away from the main plane.

7. In a device as set forth in claim 1, wherein the means to move the auxiliary plane comprises a rod pivotally secured at one end to the auxiliary plane at a point remote from the fuselage, the other end of said rod being slidable outwardly along the main plane, and means to slide said other end outwardly to move the auxiliary plane downwardly.

8. In an aircraft, a fuselage, a main plane, an auxiliary lifting plane section pivotally secured at one end adjacent the juncture of the main plane and the fuselage and being foldable upwardly closely adjacent the main plane, a strut pivotally secured adjacent one end to the auxiliary plane, a landing wheel secured to said end, the other end of said strut being slidably connected to the main plane in a manner to be moved towards or away from the fuselage, means for sliding said other end, said strut and wheel when folded being positioned in a common plane closely adjacent the main plane.

9. In an aircraft, a main plane, an auxiliary plane positioned, in normal flight, closely adjacent the lower surface of said main plane, said auxiliary plane comprising an inner section and an outer section, means for pivotally interconnecting said sections at adjacent ends, the free end of the inner section being hinged to the aircraft adjacent the fuselage, the outer free end of the other section being slidably supported on the main plane, and means to move the adjacent pivoted ends downwardly to permit said sections to form a dihedral plane below said main plane.

10. In an aircraft having a fuselage and a main plane, an auxiliary plane arranged to fold closely adjacent to the main plane, said auxiliary plane having a hinged joint adjacent its mid point providing inner and outer sections, the inner end of the auxiliary plane being hinged adjacent the fuselage, the outer end of the auxiliary plane being slidably supported on the main plane, and means to move the sections of the auxiliary plane to form a V-shaped dihedral plane spaced from the main plane.

11. In a device as set forth in claim 10, a landing device secured to said auxiliary plane adjacent the intermediate pivotal point thereof.

12. In an aircraft, a main plane, an auxiliary plane pivotally supported at its inner end adjacent the inner end of the main plane, the outer free end of the auxiliary plane being slidably supported on the main plane, said auxiliary plane comprising two sections normally positioned close to and under the main plane, means pivotally connecting said sections together, control means for extending said sections below the main plane to form a dihedral plane, and a landing device carried by said sections adjacent the pivotal interconnection thereof.

13. In a device set forth in claim 12 wherein the control means comprises two members, one member being connected to the auxiliary plane, the other member being connected to the fuselage, and means for shifting the first-named member with relation to the other member to extend the auxiliary plane sections.

14. In a device as set forth in claim 12 wherein the control means comprises a cylinder having a piston therein, a rod secured to said piston and connected at its free end adjacent the landing device, and means for supplying fluid under pressure within the cylinder for moving said piston.

ARTHUR ABNER REID.